US012164365B2

(12) United States Patent
Phan et al.

(10) Patent No.: US 12,164,365 B2
(45) Date of Patent: Dec. 10, 2024

(54) BUFFER DISPLAY DATA IN A CHIPLET ARCHITECTURE

(71) Applicants: Advanced Micro Devices, Inc., Santa Clara, CA (US); ATI Technologies ULC, Markham (CA)

(72) Inventors: Gia Tung Phan, Markham (CA); Ashish Jain, Austin, TX (US); Shang Yang, Markham (CA)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 155 days.

(21) Appl. No.: 18/146,811

(22) Filed: Dec. 27, 2022

(65) Prior Publication Data
US 2024/0211023 A1 Jun. 27, 2024

(51) Int. Cl.
*G06F 1/3296* (2019.01)
*G06F 12/0875* (2016.01)
*G06T 1/20* (2006.01)
*G06T 1/60* (2006.01)

(52) U.S. Cl.
CPC ........ *G06F 1/3296* (2013.01); *G06F 12/0875* (2013.01); *G06T 1/20* (2013.01); *G06T 1/60* (2013.01); *G06F 2212/45* (2013.01)

(58) Field of Classification Search
CPC .... G06F 1/3296; G06F 1/3206; G06F 1/3234; G06F 1/32
See application file for complete search history.

(56) References Cited

U.S. PATENT DOCUMENTS

| | | | | |
|---|---|---|---|---|
| 10,372,198 | B2 * | 8/2019 | Weissmann | G06F 9/5094 |
| 2004/0158752 | A1 * | 8/2004 | Borza | G06F 1/3296 |
| | | | | 713/320 |
| 2020/0409444 | A1 * | 12/2020 | Delshadpour | H04L 25/0298 |
| 2022/0179657 | A1 | 6/2022 | Barry et al. | |
| 2022/0413593 | A1 * | 12/2022 | Kakkireni | G06F 1/3215 |
| 2023/0097451 | A1 * | 3/2023 | Huang | G06F 3/04164 |
| | | | | 349/12 |

(Continued)

OTHER PUBLICATIONS

Internatonal Search Report and Written Opinion in International Application No. PCT/US2023/084821, mailed Apr. 24, 2024, 11 pgs.

*Primary Examiner* — Raymond N Phan
(74) *Attorney, Agent, or Firm* — Kowert, Hood, Munyon, Rankin & Goetzel, P.C.; Rory D. Rankin

(57) ABSTRACT

An apparatus and method for efficiently managing power consumption among multiple, replicated functional blocks of an integrated circuit. An integrated circuit includes multiple, replicated functional blocks that use separate power domains. Data of a given type is stored in an interleaved manner among at least two of the multiple functional blocks. In one implementation, a prior static allocation determines that only a subset of the functional blocks store the data of the given type. In another implementation, each of the functional blocks stores the data of the given type, and when an idle state has occurred, data of the given type is moved between the multiple functional blocks until one or more functional blocks no longer store data of the given type. When a transition to the idle state has occurred, the functional blocks that do not store the data of the given type are transitioned to a sleep state.

20 Claims, 12 Drawing Sheets

(56) References Cited

U.S. PATENT DOCUMENTS

| | | | |
|---|---|---|---|
| 2023/0238800 A1* | 7/2023 | Musunuri | G06F 1/3296 |
| | | | 700/295 |
| 2023/0297159 A1* | 9/2023 | Daxer | G06F 1/3296 |
| | | | 713/324 |
| 2023/0350482 A1* | 11/2023 | Xiong | G11C 16/30 |
| 2024/0192759 A1* | 6/2024 | Kushnir | G06F 1/329 |

\* cited by examiner

BUFFER DISPLAY DATA IN A CHIPLET ARCHITECTURE

BACKGROUND

Description of the Relevant Art

Both planar transistors (devices) and non-planar transistors are fabricated for use in integrated circuits within semiconductor chips. A variety of choices exist for placing processing circuitry in system packaging to integrate multiple types of integrated circuits. Some examples are a system-on-a-chip (SOC), multi-chip modules (MCMs) and a system-in-package (SiP). Mobile devices, desktop systems, and servers use these packages. Regardless of the choice for system packaging, in several uses, power consumption of modern integrated circuits has become an increasing design issue with each generation of semiconductor chips.

As power consumption increases, more costly cooling systems such as larger fans and heat sinks are utilized to remove excess heat and prevent failure of the integrated circuit. However, cooling systems increase system costs. The power dissipation constraint of the integrated circuit is not only an issue for portable computers and mobile communication devices, but also for high-performance desktop computers and server computers. Power management circuitry assigns operating parameters to different partitions of an integrated circuit. The operating parameters include at least an operating power supply voltage and an operating clock frequency.

Although a partition can have no computational tasks to perform during a particular time period while an application is running, the power management circuitry is unable to assign a sleep state to the partition due to occasional maintenance tasks targeting the partition. Recent integrated circuits include multiple replicated functional blocks in the partition to increase throughput. Each functional block includes one or more sub-blocks for data processing, one or more levels of cache, and an interface to communicate with local memory. In one example, when a video graphics application is executed by the integrated circuit, a partition that includes multiple functional blocks responsible for rendering video frame data has no further computational tasks to perform when the image presented on a display device has no updates. The image remains unchanged during a pause of the application, during a wait time for user input information, or other condition that doesn't require updates to the image despite the application is still running. However, the power management circuitry is unable to assign a sleep state to the multiple functional blocks due to periodic refresh operations that request data to be retrieved from the multiple functional blocks and sent to the display device.

In view of the above, methods and mechanisms for efficiently managing power consumption of multiple, replicated functional blocks of an integrated circuit are desired.

Figure 1:
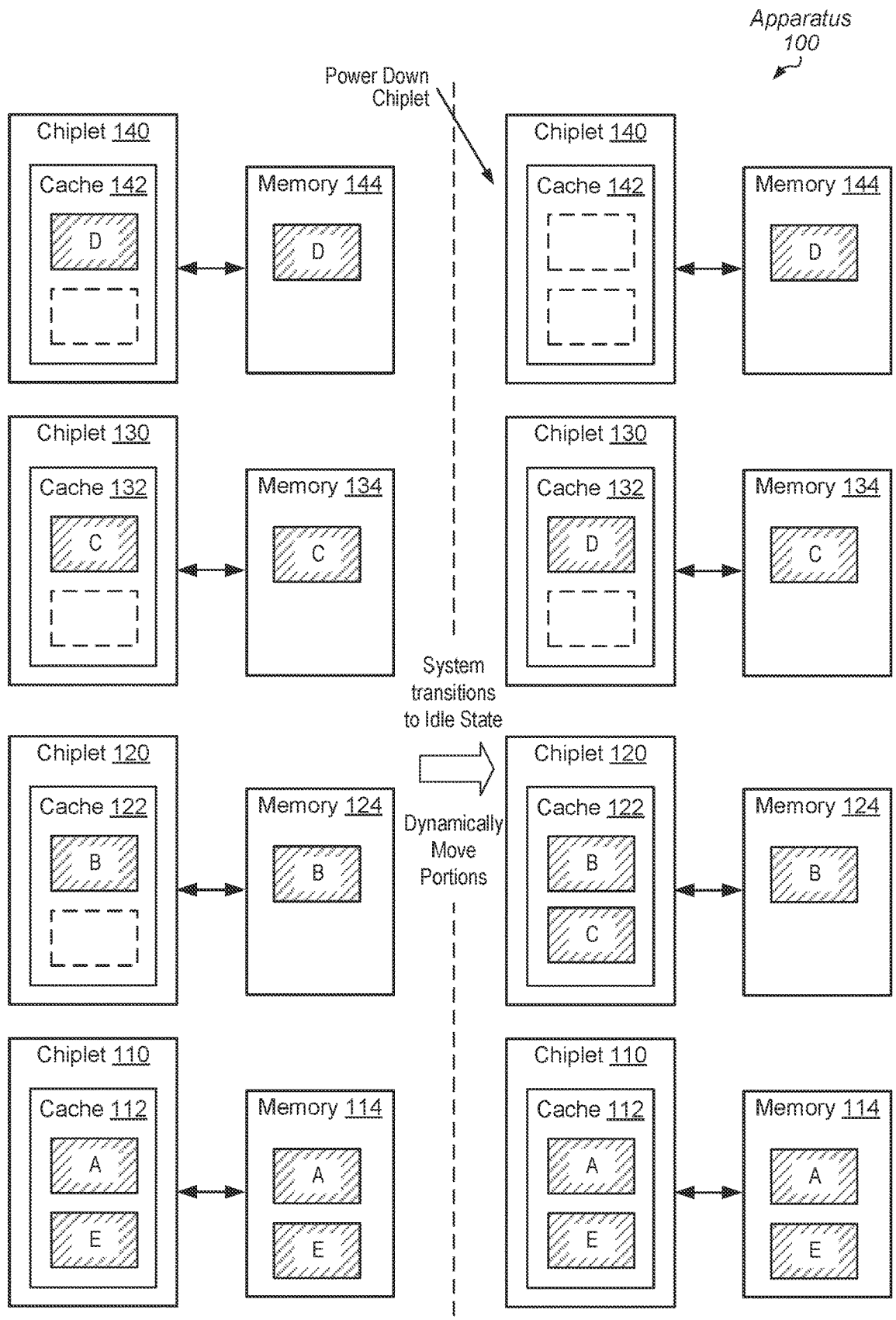
FIG. 1 is a generalized block diagram of an apparatus that manages power consumption among replicated functional blocks of an integrated circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing power consumption among multiple, replicated functional blocks of an integrated circuit are contemplated. In the case of using a multi-chip module (MCM), one or more of multiple, replicated chiplets are connected to separate power rails, and therefore, can use separate power domains. The multiple, replicated chiplets are provided from a silicon wafer separate from silicon wafers of other functional blocks used in the MCM. In the case of using a system-on-chip (SoC), one or more of the functional blocks are connected to separate power rails, and therefore, can use separate power domains. The multiple, replicated functional blocks are provided from a same silicon wafer that provides other functional blocks used in the SoC. Therefore, the techniques and steps described in the upcoming description directed to power management of multiple, replicated chiplets placed in a MCM are also applicable for power management of multiple, replicated functional blocks placed in an SoC.

In various implementations, an integrated circuit includes multiple, replicated functional blocks that use separate power domains. The multiple functional blocks store data of a given type in an interleaved manner among at least two of the multiple functional blocks. In an implementation, the data of the given type is video frame data of a frame buffer that has been rendered by the multiple functional blocks. An idle state can indicate a static screen of the display device connected to the display controller. When a transition to an idle state has occurred, one or more of the functional blocks that do not store the data of the given type are transitioned to a sleep state. In some implementations, a prior static allocation determines that only a subset of the functional blocks store the data of the given type. Those functional blocks that are not assigned to the subset can immediately transition to the sleep state when the idle state occurs. In another implementation, each of the functional blocks is permitted to store the data of the given type, and when the idle state occurs, the power manager or other circuitry moves data of the given type between the multiple functional blocks until one or more functional blocks no longer store data of the given type. These functional blocks are then transitioned to the sleep state. In some implementations, the functional blocks are powered off, rather than transitioned to the sleep state.

Turning now to FIG. 1, a generalized block diagram is shown of an apparatus 100 that manages power consumption among replicated chiplets of an integrated circuit. In the illustrated implementation, the apparatus 100 includes multiple replicated chiplets 110, 120, 130 and 140. Each of the chiplets 110, 120, 130 and 140 is connected to a corresponding one of the memories 114, 124, 134 and 144. In addition, in a corresponding one of the caches 112, 122, 132 and 142, each of the chiplets 110, 120, 130 and 140 is capable of storing a copy of data that is stored in the memories 114, 124, 134 and 144.

As used herein, a "chiplet" is also referred to as a "functional block," or an "intellectual property block" (or IP block). However, a "chiplet" is a semiconductor die (or die) fabricated separately from other dies, and then interconnected with other dies in a single integrated circuit in system packaging known as multi-chip modules (MCMs). A chiplet is a type of functional block. However, a functional block can also include blocks fabricated with other functional blocks on a larger semiconductor die such as a system-on-chip (SoC). Therefore, a chiplet is a subset of the types of functional blocks. A chiplet is fabricated as multiple copies by itself on a silicon wafer, rather than fabricated with other functional blocks on a larger semiconductor die such as an SoC. For example, a first silicon wafer (or first wafer) is fabricated with multiple copies of a first chiplet, and this first wafer is diced using laser cutting techniques to separate the multiple copies of the first chiplet.

A second silicon wafer (or second wafer) is fabricated with multiple copies of a second chiplet, and this second wafer is diced using laser cutting techniques to separate the multiple copies of the second chiplet. The first chiplet provides functionality different from the functionality of the second chiplet. One or more copies of the first chiplet is placed in an integrated circuit, and one or more copies of the second chiplet is placed in the integrated circuit. The first chiplet and the second chiplet are interconnected to one another within a corresponding MCM. Such a process replaces a process that fabricates a third silicon wafer (or third wafer) with multiple copies of a single, monolithic semiconductor die that includes the functionality of the first chiplet and the second chiplet as integrated functional blocks within the single, monolithic semiconductor die.

Process yield of single, monolithic dies on a silicon wafer is lower than process yield of smaller chiplets on a separate silicon wafer. In addition, a semiconductor process can be adapted for the particular type of chiplet being fabricated. With single, monolithic dies, each die on the wafer is formed with the same fabrication process. However, it is possible that an interface functional block does not require process parameters of a semiconductor manufacturer's expensive process that provides the fastest devices and smallest geometric dimensions that are beneficial for a high throughput processing unit on the die. With separate chiplets, designers can add or remove chiplets for particular integrated circuits to readily create products for a variety of performance categories. In contrast, an entire new silicon wafer must be fabricated for a different product when single, monolithic dies are used.

The following description describes power management of multiple, replicated chiplets placed in a MCM where the multiple, replicated chiplets are provided from a silicon wafer separate from silicon wafers of other functional blocks used in the MCM. However, the following description is also applicable to the power management of multiple, replicated functional blocks located on a SoC where the multiple, replicated functional blocks are provided from a same silicon wafer that provides other functional blocks used in the SoC. In the case of using an MCM, one or more of the chiplets are connected to separate power rails, and therefore, can use separate power domains. Similarly, in the case of using an SoC, one or more of the functional blocks are connected to separate power rails, and therefore, can use separate power domains.

Although not shown for ease of illustration, each of the chiplets 110, 120, 130 and 140 also includes one or more sub-blocks that provide a variety of functionalities. These sub-blocks utilize transistors. As used herein, a "transistor" is also referred to as a "semiconductor device" or a "device." The chiplets 110, 120, 130 and 140 uses p-type metal oxide semiconductor (PMOS) field effect transistors FETS (or pfets) in addition to n-type metal oxide semiconductor (NMOS) FETS (or nfets). In some implementations, the devices (or transistors) in the memory array portion 100 are planar devices. In other implementations, the devices (or transistors) in the memory array portion 100 are non-planar devices. Examples of non-planar transistors are tri-gate transistors, fin field effect transistors (FETs), and gate all around (GAA) transistors. In some implementations, the chiplets 110, 120, 130 and 140 includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to a central processing unit (CPU) that includes one or more general-purpose processor cores. Alternatively, a 3D IC is stacked directly on top of another IC.

As shown, each of the chiplets 110, 120, 130 and 140 and each of the memories 114, 124, 134 and 144 stores a copy of one or more portions of data of a given type. Each of the memories 114, 124, 134 and 144 is one of a variety of types of dynamic random-access memory (DRAM). The portions of data of the given type are shown as shaded boxes with a corresponding alphabetical letter used to identify it. For example, the memory 114 stores a copy of the portion "A" and a copy of the portion "E." The memory 124 stores a copy of the portion "B," the memory 134 stores a copy of the portion "C," and the memory 144 stores a copy of the portion "D." The caches 112, 122, 132 and 142 store a copy of data that is stored in a corresponding one of the memories 114, 124, 134 and 144. For example, the cache 112 stores a copy of the portion "A" and a copy of the portion "E." The cache 114 stores a copy of the portion "B," and so forth.

In an implementation, the chiplets 110, 120, 130 and 140 process tasks of a video graphics workload such as rendering video frame data for a display device (not shown). The data of the given type is image data (e.g., video frame data of a frame buffer) that has been rendered by the chiplets 110, 120, 130 and 140. This data of the given type is sent from the chiplets 110, 120, 130 and 140 to a display device. In some implementations, the chiplets 110, 120, 130 and 140 store data of the given type in an interleaved manner amongst themselves. For example, a first portion of the data of the given type (portion "A") is stored in a first chiplet (chiplet 110), and a second portion different (portion "B") from the first portion (portion "A") of the data of the given type is stored in a second chiplet (chiplet 120). A third portion (portion "C") different from the first portion and the second portion of the data of the given type is stored in a third chiplet (chiplet 110), and so on. When the last chiplet (chiplet 140) of the multiple chiplets has a portion (portion "D") of the data of the given type stored in it, a next portion (portion "E") of the data of the given type is stored in the first chiplet (chiplet 110). Data storage of the data of the given type continues in this manner.

In some implementations, each portion of data is a contiguous portion compared to a previous portion of a larger data set (such as a video frame buffer), and each portion has a same size. In other implementations, one or more portions have a different size, and one or more portions is not a contiguous portion compared to a previous portion. In an implementation, power management circuitry (not shown) either determines an idle state for a computing system using the chiplets 110, 120, 130 and 140, or receives an indication of the idle state. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system that utilizes the chiplets 110, 120, 130 and 140 enters an idle state although the video graphics application has not stopped being executed.

The power management circuitry (or other circuitry) identifies a subset of the chiplets 110, 120, 130 and 140 that do not utilize a corresponding cache above a threshold for storing data of the given type. The threshold can be a value stored in a programmable configuration and status register (CSR). In one implementation, the threshold is stored in a CSR with a value indicating an amount of data one byte less than two portions. Therefore, a chiplet of chiplets 110, 120, 130 and 140 that stores, in a corresponding cache, an amount of data of the given type equal to at least two portions has utilized its cache above the threshold. Otherwise, the chiplet of chiplets 110, 120, 130 and 140 that stores, in the corresponding cache, an amount of data of the given type one or more bytes less than two portions has not utilized its cache above the threshold. Consequently, the power management circuitry (or other circuitry) identifies this chiplet as being in the subset of chiplets that do not utilize a corresponding cache above the threshold. At a later time, one or more bytes of data of the given type can be transferred from another cache to the cache of this chiplet.

In another implementation, the threshold is stored in the CSR with a value indicating an amount of data equal to a particular number of portions where the particular number is a positive, non-zero integer. In such an implementation, the chiplets 110, 120, 130 and 140 transfer data at a granularity of a portion, rather than transfer data at a granularity of a byte. Therefore, a chiplet of chiplets 110, 120, 130 and 140 that stores, in a corresponding cache, an amount of data of the given type equal to at least the particular number of portions has utilized its cache above the threshold. Otherwise, the chiplet of chiplets 110, 120, 130 and 140 that stores, in the corresponding cache, an amount of data of the given type at least one or more portions less than the particular number of portions has not utilized its cache above the threshold. Consequently, the power management circuitry (or other circuitry) identifies this chiplet as being in the subset of chiplets that do not utilize a corresponding cache above the threshold. At a later time, one or more portions of data of the given type can be transferred from another cache to the cache of this chiplet. In other implementations, it is possible and contemplated that other thresholds and other granularities for transferring data between chiplets are selected and are based on design requirements.

As shown, the cache 112 of chiplet 110 stores an amount of data of the given type that exceeds the threshold. In contrast, each of the caches 122, 132 and 142 do not store an amount of data of the given type that exceeds the threshold. The power management circuitry (or other circuitry) sends commands to the chiplets 120, 130 and 140 to transfer data of the given type between themselves until at least one chiplet of the subset no longer stores data of the given type. For example, the chiplet 130 sends the copy of portion "C" to be stored in cache 122 of chiplet 120. The copy of portion "C" stored in memory 134 remains in memory 134. The chiplet 120 does not store a copy of portion "C" in memory 124. The cache 122 now stores an amount of data of the given type that exceeds the threshold. In a similar manner, the chiplet 140 sends the copy of portion "D" to be stored in cache 132 of chiplet 130. The copy of portion "D" stored in memory 144 remains in memory 144. The chiplet 130 does not store a copy of portion "D" in memory 134. The cache 132 still does not store an amount of data of the given type that exceeds the threshold. The cache 142 now no longer stores data of the given type.

Following, the power management circuitry (or other circuitry) transitions the chiplet 140 that no longer stores data of the given type to a sleep state. The sleep state is a minimum power consumption state while the corresponding functional block still receives a power supply voltage. In other implementations, the power management circuitry (or other circuitry) powers down the chiplet 140, rather than transitions the chiplet 140 to the sleep state. When the power management circuitry powers down the chiplet 140, the power rails for the chiplet 140 no longer receive a power supply voltage. The sleep state and one or more active states can be associated with one or more power-performance states (P-states) that indicate a respective power domain managed by the power management circuitry. Each of the power domains includes at least operating parameters such as at least an operating power supply voltage and an operating clock frequency. Each of the power domains also includes control signals for enabling and disabling connections to clock generating circuitry and a power supply reference. In various implementations, each of the chiplets 110, 120, 130 and 140 utilizes a separate power rail and can be set to a separate power domain. The power management circuitry assigns operating parameters of an active state to the chiplets 110, 120 and 130, and assigns the sleep state to chiplet 140. The assigned active state can be associated with a low power-performance state (P-state), but the assigned active state allows the chiplets 110, 120 and 130 to still process a task when requested with minimal latency.

During the idle state of the video subsystem, the chiplets 110, 120 and 130, which store data of the given type (portions "A" to "E"), process any generated requests targeting the data of the given type. For example, despite not requesting new frame data to be rendered, the display device of the computing system still performs refresh operations. In this case, the data of the given type (portions "A" to "E") are the rendered data of the last frame to be processed before the transition to the idle state indicating a static screen of the display device. To perform the refresh operations, the display device requests data of the given type (portions "A" to "E") from the chiplets 110, 120 and 130 of the apparatus 100. While still supporting the refresh operations, the apparatus 100 reduces power consumption by transitioning the chiplet 140 to the sleep state, rather than maintaining the chiplet 140 in an active state.

Figure 2:
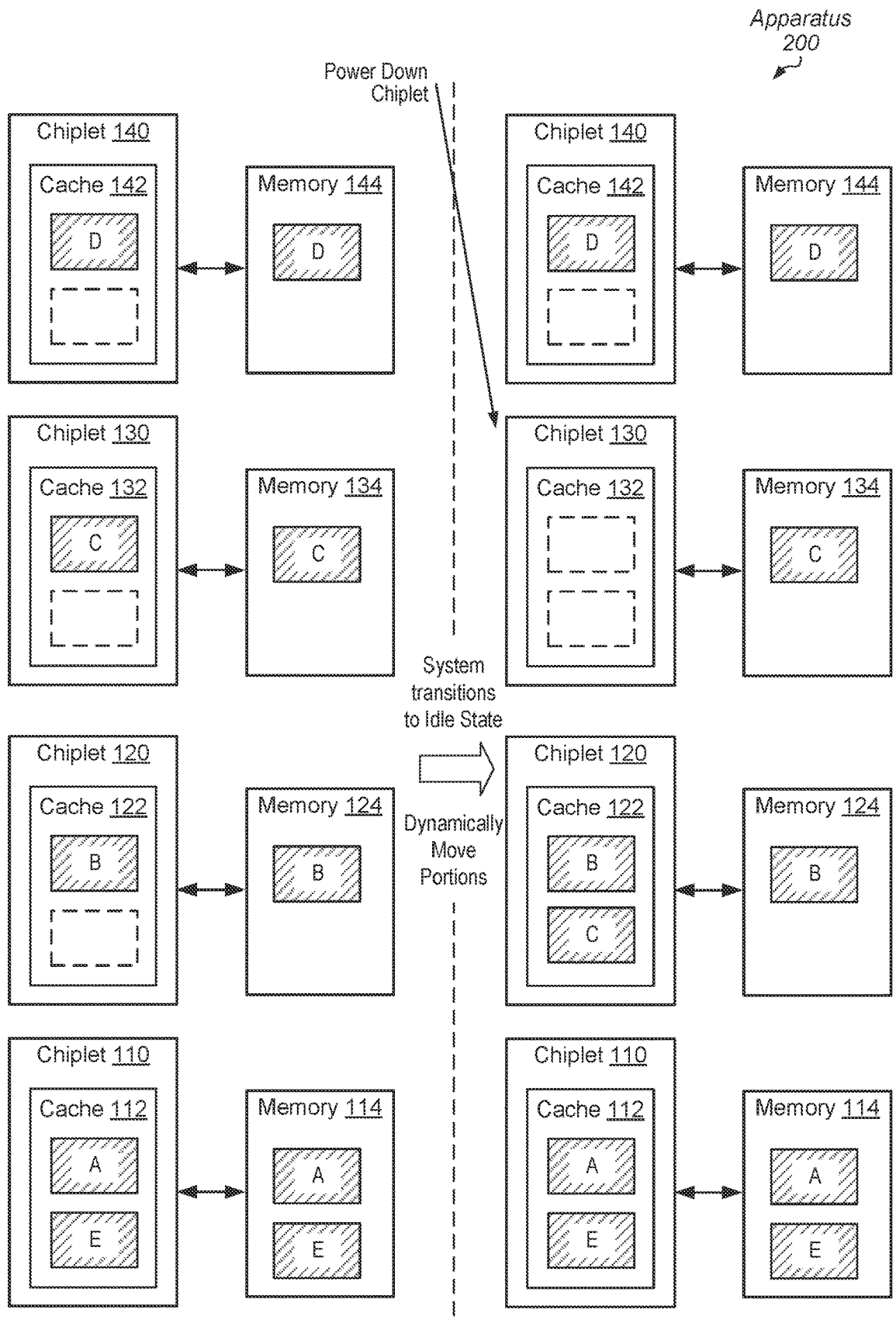
FIG. 2 is a generalized block diagram of an apparatus that manages power consumption among replicated functional blocks of an integrated circuit.

Referring to FIG. 2, a generalized block diagram is shown of an apparatus 200 that manages power consumption among replicated chiplets of an integrated circuit. Circuits and signals described earlier are numbered identically. Here, each of the chiplets 110, 120, 130 and 140 and each of the memories 114, 124, 134 and 144 store a corresponding copy of the portions "A" to "E" as shown earlier. When the power management circuitry (not shown) either determines an idle state, or receives an indication of the idle state that indicates a static screen of the display device, the chiplet 130 sends the copy of portion "C" to be stored in cache 122 of chiplet 120 as described earlier. In some implementations, the cache 132 supports a writeback policy, and therefore, the cache 132 updates the copy of the portion "C" in the memory 134 prior to invalidating the copy of the portion "C" in the cache 132. In another implementation, the cache 132 supports a write-through policy, and therefore, the memory 134 already stores a most-recent copy of the portion "C." Consequently, no update is performed in the memory 134. In yet another implementation, the cache 132 flushes the contents of the data of the given type, and any modified ("dirty") data is written to the memory 134. The copy of portion "C" stored in memory 134 remains in memory 134. The chiplet 120 does not store a copy of portion "C" in memory 124. However, the cache 132 no longer stores data of the given type. Therefore, in contrast to the implementation described earlier, the chiplet 140 does not send the copy of portion "D" to be stored in cache 132 of chiplet 130. Rather, the chiplet 140 continues to store the copy of portion "D" in its cache 142.

Following, the power management circuitry transitions the chiplet 130 that no longer stores data of the given type to a sleep state. The power management circuitry assigns operating parameters of an active state to the chiplets 110, 120 and 140, and assigns the sleep state to chiplet 130. The assigned active state can be associated with a low power-performance state (P-state), but the assigned active state allows the chiplets 110, 120 and 140 to still process a task when requested with minimal latency. In an implementation, the data of the given type (portions "A" to "E") are the rendered data of the last frame to be processed before the transition to the idle state indicating a static screen of the display device. To perform the refresh operations, the display device requests data of the given type (portions "A" to "E") from the chiplets 110, 120 and 140 of the apparatus 100. While still supporting the refresh operations, the apparatus 100 reduces power consumption by transitioning the chiplet 130 to the sleep state, rather than maintaining the chiplet 130 in an active state.

It is noted that when the idle state ends, in some implementations, each of the caches 112-142 invalidates its contents, and later fetches the corresponding portions from memories 114-144. For example, cache 122 of the chiplet 120 currently stores the portion "B" and the portion "C" during the idle state. When the idle state ends, and the chiplets 110-140 are expected to render video frame data again, the cache 122 invalidates its contents. Afterward, the cache 122 fetches the portion "B" from memory 124, and stores the portion "B." The cache 122 no longer stores the portion "C." Instead, the cache 132 fetches the portion "C" from memory 134, and stores the portion "C." In another implementation, when the idle state ends, the chiplets 110-140 transfer the portions between one another to return to the state used prior to the idle state. For example, the chiplet 120 sends the portion "C" to the chiplet 130 for storing the portion "C" in cache 132.

Figure 3:
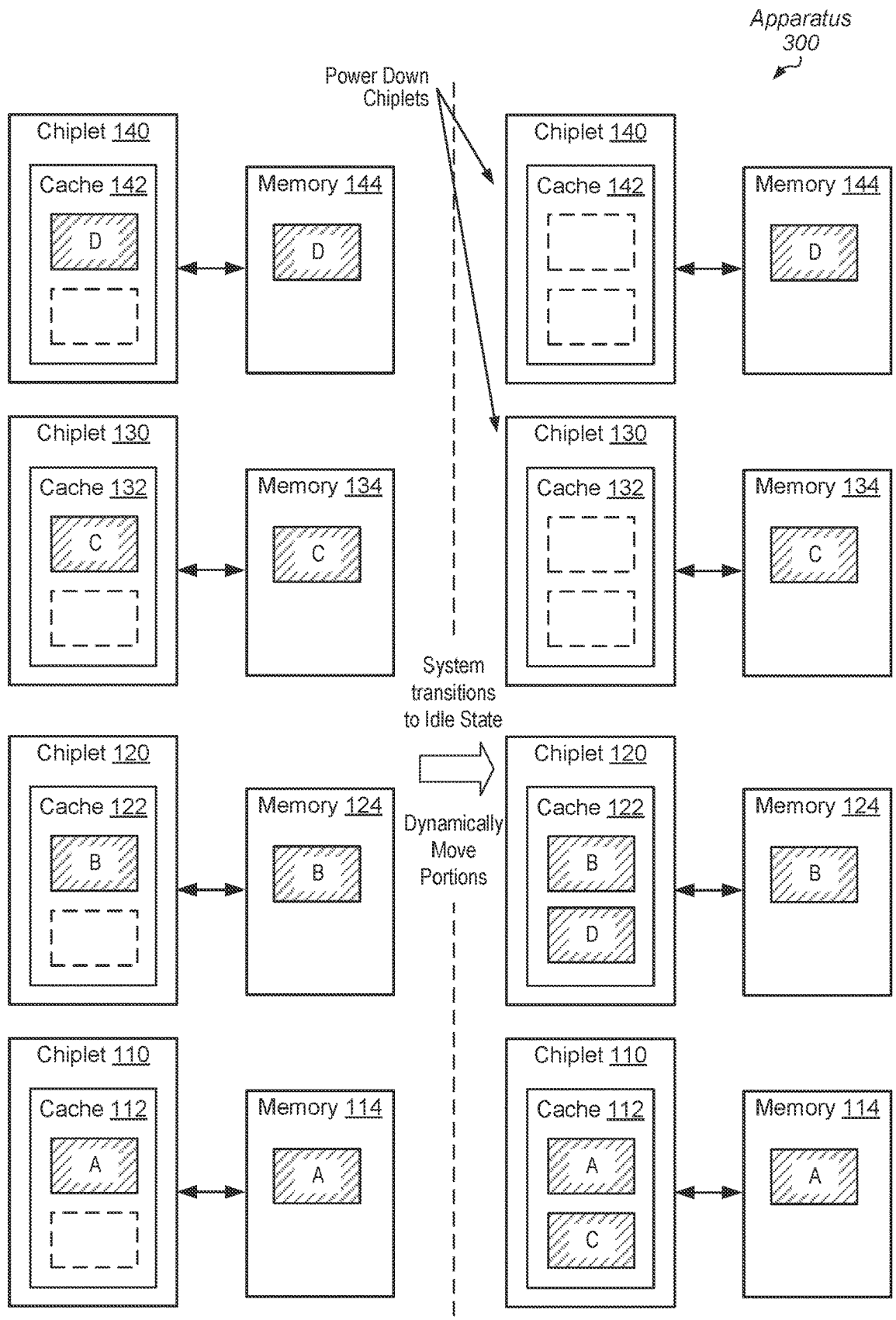
FIG. 3 is a generalized block diagram of an apparatus that manages power consumption among replicated functional blocks of an integrated circuit.

Turning now to FIG. 3, a generalized block diagram is shown of an apparatus 300 that manages power consumption among replicated chiplets of an integrated circuit. Circuits and signals described earlier are numbered identically. Here, each of the chiplets 110, 120, 130 and 140 and each of the memories 114, 124, 134 and 144 store a corresponding copy of the portions "A" to "D" as shown earlier. The amount of the data of the given type is less than the amount in the earlier implementations. For example, the frame buffer of rendered video frame data represented by portions "A" to "D" is smaller than the frame buffer of rendered video frame data represented by portions "A" to "E" when the portions have the same size.

The chiplets 110, 120, 130 and 140 store the portions "A" to "D" in the interleaved manner in order to hide overhead latency of the memory devices used to implement the memories 114, 124, 134 and 144. For example, each of the steps of opening a page in DRAM, storing the targeted page in a row buffer, accessing the row buffer, and closing the page includes appreciable latency. When the power management circuitry (not shown) either determines an idle state, or receives an indication of the idle state that indicates a static screen of the display device, the chiplet 130 sends the copy of portion "C" to be stored in cache 112 of chiplet 110. The copy of portion "C" stored in memory 134 remains in memory 134. The chiplet 110 does not store a copy of portion "C" in memory 114. The cache 132 no longer stores data of the given type. Similarly, the chiplet 140 sends the copy of portion "D" to be stored in cache 122 of chiplet 120. The copy of portion "D" stored in memory 144 remains in memory 144. The chiplet 120 does not store a copy of portion "D" in memory 124. The cache 142 no longer stores data of the given type.

Following, the power management circuitry transitions each of the chiplets 130 and 140 that no longer store data of the given type to a sleep state. The power management circuitry assigns operating parameters of an active state to the chiplets 110 and 120, and assigns the sleep state to chiplets 130 and 140. The assigned active state can be associated with a low power-performance state (P-state), but the assigned active state allows the chiplets 110 and 120 to still process a task when requested with minimal latency. To perform the refresh operations, the display device requests data of the given type (portions "A" to "D") from the chiplets 110 and 120 of the apparatus 100. While still supporting the refresh operations, the apparatus 300 reduces power consumption by transitioning the chiplets 130 and 140 to the sleep state, rather than maintaining the chiplets 130 and 140 in an active state.

It is noted again that the above description describes power management of multiple, replicated chiplets placed in a MCM where the multiple, replicated chiplets are provided from a silicon wafer separate from silicon wafers of other functional blocks used in the MCM. However, the above description is also applicable to the power management of multiple, replicated functional blocks located on a SoC where the multiple, replicated functional blocks are provided from a same silicon wafer that provides other functional blocks used in the SoC. In the case of using an MCM, one or more of the chiplets are connected to separate power rails, and therefore, can use separate power domains. Similarly, in the case of using an SoC, one or more of the functional blocks are connected to separate power rails, and therefore, can use separate power domains. Therefore, the power management of apparatuses 100-300 (of FIGS. 1-3) can also be used for multiple, replicated functional blocks of an SoC. Similarly, the power management techniques and steps provided in the below description of FIGS. 4-12 directed to multiple, replicated chiplets placed in a MCM are also applicable for multiple, replicated functional blocks placed in an SoC.

Figure 4:
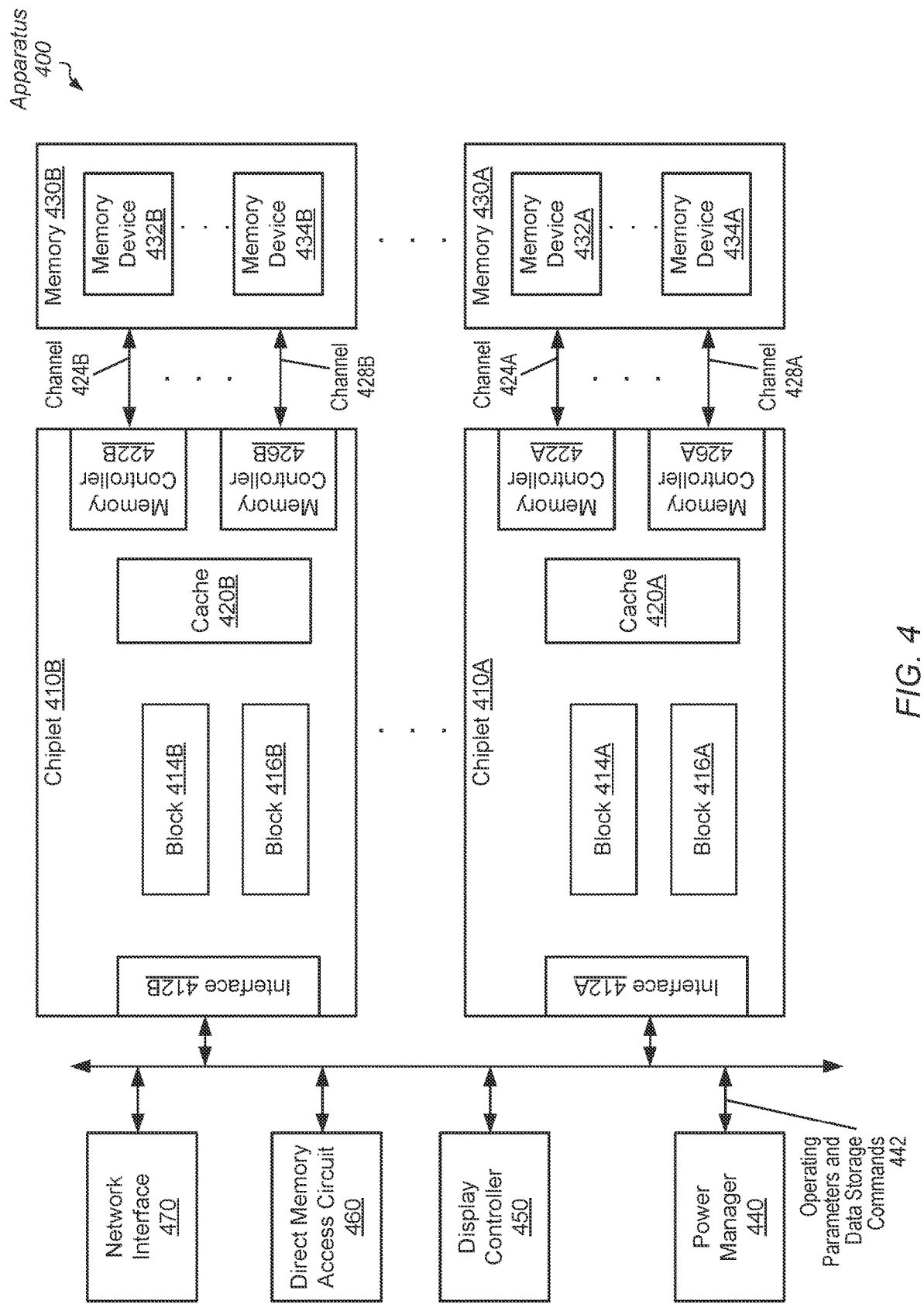
FIG. 4 is a generalized block diagram of an apparatus that manages power consumption among replicated functional blocks of an integrated circuit.

Referring to FIG. 4, a generalized block diagram is shown of an apparatus 400 that manages power consumption among replicated chiplets of an integrated circuit. In the illustrated implementation, the apparatus 400 includes the power manager 440, the display controller 450, the direct memory access (DMA) circuit 460, the network interface 470, and at least two chiplets such as chiplets 410A-410B. In various implementations, the circuitry of the chiplet 410B is an instantiation of the circuitry of the chiplet 410A. Although only two chiplets 410A-410B are shown, other numbers of chiplets used by apparatus 400 are possible and contemplated and the number is based on design requirements. Other components of the apparatus 400 are not shown for ease of illustration. For example, an off-chip memory controller, one or more input/output (I/O) interface units, interrupt controllers, one or more phased locked loops (PLLs) or other clock generating circuitry, and a variety of other functional blocks are not shown although they can be used by the apparatus 400.

In some implementations, the functionality of the apparatus 400 is included as components on a single die such as a single integrated circuit. In an implementation, the functionality of the apparatus 400 is included as one die of multiple dies on a multi-chip module (MCM). In various implementations, the apparatus 400 is used in a desktop, a portable computer, a mobile device, a server, a peripheral device, or other. The apparatus 400 is also capable of communicating with a variety of other external circuitry such as one or more of a digital signal processor (DSP), a variety of application specific integrated circuits (ASICs), a multimedia engine, and so forth.

The hardware, such as circuitry, of each of the blocks 414A and 416A provides a variety of functionalities. In some implementations, one or more of the blocks 414A and 416A include a relatively wide single-instruction-multiple-data (SIMD) microarchitecture. For example, one or more of the blocks 414A and 416A is used as a dedicated GPU (or dGPU), a dedicated video graphics chip or chipset, or other. In some implementations, one or more of the blocks 414A and 416A render video frame data that is later sent to the display controller 450. In an implementation, the cache 420A is a last-level cache of a cache memory subsystem hierarchy. The cache 420A can support a writeback policy, or the cache 420A can support a writethrough policy. The chiplet 410A uses the local memory controllers 422A and 426A to transfer data with the local memory 430A via the communication channels 424A and 428A.

The local memory 430A includes the memory devices 432A and 434A. In some implementations, each of the memory devices 432A and 434A is one of a variety of types of synchronous dynamic random-access memory (SDRAM) specifically designed for applications requiring both high memory data bandwidth and high memory data rates. In other implementations, each of the memory devices 432A and 434A is another type of DRAM. In various implementations, each of the communication channels 424A and 428A is a point-to-point (P2P) communication channel. A point-to-point communication channel is a dedicated communication channel between a single source and a single destination. Therefore, the point-to-point communication channel transfers data only between the single source and the single destination. The address information, command information, response data, payload data, header information, and other types of information are transferred on metal traces or wires that are accessible by only the single source and the single destination. In an implementation, the local memory controllers 422A and 426A support one of a variety of types of a Graphics Double Data Rate (GDDR) communication protocol.

It is noted that although the communication channels 424A and 428A use the term "communication channel," each of the communication channels 424A and 428A is capable of transferring data across multiple memory channels supported by a corresponding memory device. For example, a single memory channel of a particular memory device can include 60 or more individual signals with 32 of the signals dedicated for the response data or payload data. A memory controller or interface of the memory device can support multiple memory channels. Each of these memory channels is included within any of the communication channels 424A and 428A.

The interface 412A includes circuitry that allows the chiplet 410A to communicate with external integrated circuits such as at least the components 440-470 shown. One or more of a communication bus, a point-to-point channel, a communication fabric, or other are used to transfer data and commands between the chiplets 410A-410B and at least the components 440-470. The network interface 470 supports a communication protocol for communication with one of a variety of types of a network. The DMA circuit 460 supports memory mapping and a communication protocol used to communicate with one of a variety of types of system memory. The display controller 450 receives rendered video frame data from the chiplets 410A-410B and prepares this data to present an image on a corresponding display device. Each of the chiplets 410A-410B is assigned a respective power domain by the power manager 440. The power domain includes at least operating parameters such as at least an operating power supply voltage and an operating clock frequency. Each of the power domains also includes control signals for enabling and disabling connections to clock generating circuitry and a power supply reference.

In some implementations, the hardware, such as circuitry, of the power manager 440 determines when tasks of a workload enter an idle state. In other implementations, the power manager 440 receives an indication of the idle state. The idle state can indicate a static screen of the display device connected to the display controller 450. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system, such as the chiplets 410A-410B, enters an idle state although the video graphics application has not stopped being executed. The power manager 440 sends operating parameters and data storage commands 442 to the chiplets 410A-410B. For example, the power manager 440 performs the steps described regarding the description of power management by the apparatuses 100-300 (of FIGS. 1-3) and apparatuses 800-900 (of FIGS. 8-9). In another implementation, other circuitry other than the power manager 440 sends the data storage commands to the chiplets 410A-410B. In some implementations, each of the chiplets 410A-410B has the functionality of the chiplets 110-140 (of FIGS. 1-3 and 8-9).

Figure 5:
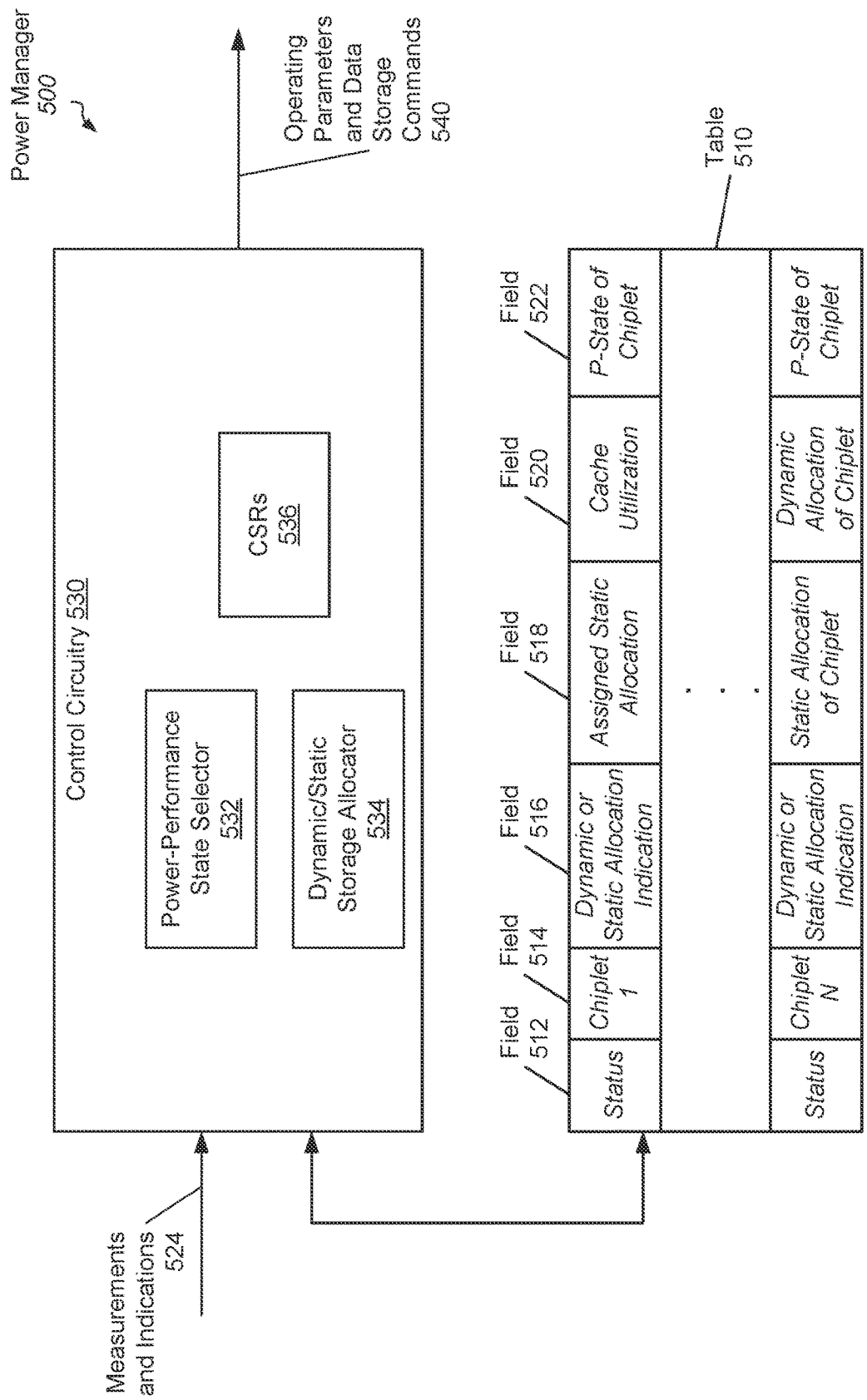
FIG. 5 is a generalized block diagram of a power manager that manages power consumption among replicated functional blocks of an integrated circuit.

Turning now to FIG. 5, a generalized block diagram is shown of a power manager 500 that manages power consumption among replicated chiplets of an integrated circuit. As shown, the power manager 500 includes the table 510 and the control circuitry 530. The control circuitry 530 includes multiple components 532-538 that are used to generate the operating parameters and data storage commands 540 to update power domains of multiple chiplets. The table 510 includes multiple table entries (or entries), each storing information in multiple fields such as at least fields 512-522. The table 510 is implemented with one of flip-flop circuits, a random-access memory (RAM), a content addressable memory (CAM), or other. Although particular information is shown as being stored in the fields 512-522 and in a particular contiguous order, in other implementations, a different order is used and a different number and type of information is stored. As shown, field 512 stores status information such as at least a valid bit. Field 514 stores an identifier that specifies one of the multiple chiplets.

Field 516 stores an indication of whether dynamic identification or static allocation is being used for storing data of a given type in the multiple chiplets. Field 518 stores an indication specifying the assigned static allocation such as one half of the multiple chiplets, one fourth of the multiple chiplets, or other. Field 520 stores a value indicating the cache utilization for storing data of the given type in a particular cache of the chiplet. For example, a last-level cache is monitored for its cache utilization. Field 522 stores a current value indicating the most-recent P-state or power domain for the chiplet.

The control circuitry 530 receives usage measurements and indications 524, which represent activity levels of the chiplets and power consumption measurements or parameters used to determine recent power consumption values of the chiplets. The power-performance state (P-state) selector 532 selects the next operating parameters to use for the chiplets. The dynamic/static storage allocator 534 (or allocator 534) includes circuitry that determines whether dynamic identification or static allocation is being used for storing data of a given type in the multiple chiplets. In some implementations, the data of the given type is video frame data, and the allocator 534 receives an indication of expected sizes of frame data for a video graphics application. Based on the expected size, the sizes of the last-level caches of the chiplets, expected performance degradation when reducing the number of available chiplets to use for video rendering, any quality of service (QoS) values associated with the video graphics application, values stored in the table 510, and so on, the allocator 534 determines whether dynamic identification or static allocation is being used for storing data of the given type in the multiple chiplets. Examples of the dynamic identification are provided in the earlier description of the apparatuses 100-300 (of FIGS. 1-3) and upcoming description of the method 1000 (of FIG. 10). Examples of the static allocation are provided in the upcoming description of the apparatuses 800-900 (of FIGS. 8-9) and upcoming description of the method 1100 (of FIG. 11).

One or more components of the power manager 500 use values stored in the configuration and status registers (CSRs) 536. The CSRs 536 store values such as a threshold of cache utilization, a performance threshold, and so forth. These threshold values are the same values described regarding the apparatuses 100-300 (of FIGS. 1-3), the method 1000 (of FIG. 10), the apparatuses 800-900 (of FIGS. 8-9), and the method 1100 (of FIG. 11). In some implementations, one or more of the components of power manager 500 and corresponding functionality is provided in another external circuit, rather than provided here in power manager 500.

Figure 6:
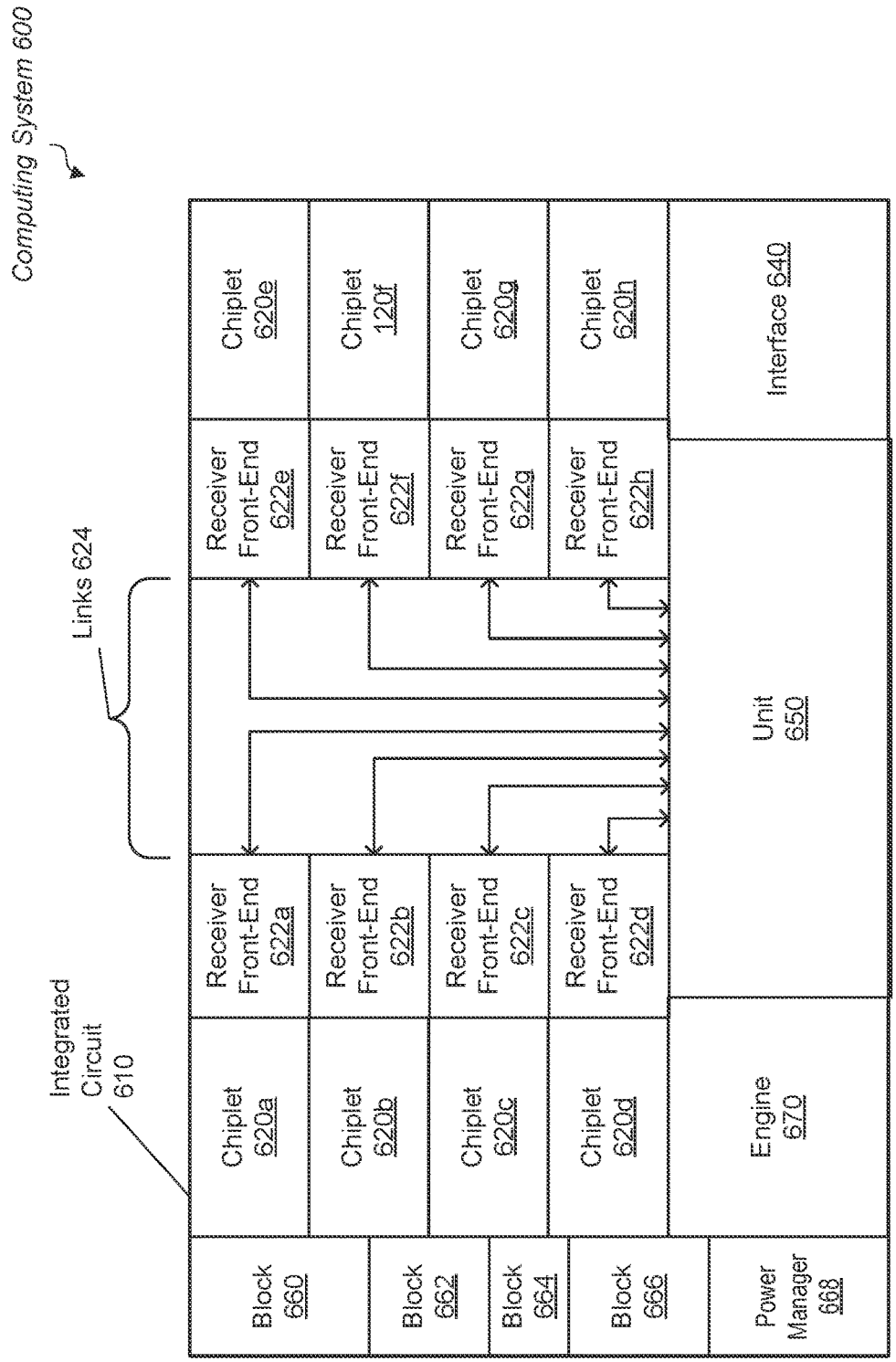
FIG. 6 is a generalized block diagram of a computing system that manages power consumption among replicated functional blocks of an integrated circuit.

Turning now to FIG. 6, a generalized block diagram is shown of one implementation of a computing system 600 that manages power consumption among replicated chiplets of an integrated circuit. The integrated circuit 610 includes chiplets 620a-620h, interface 640, unit 650, functional blocks 660-666, and engine 670. The chiplets 620a-620h use receiver front-end blocks 622a-622h for communicating with unit 650. The integrated circuit 610 includes multiple types of designs providing a variety of functionalities. In some implementations, the integrated computing system 600 is a multi-chip module (MCM) that includes a variety of processing units and functional blocks providing a variety of functionalities. In an implementation, interface 640, unit 650, functional blocks 660-666, and engine 670 provide separate functionality. In contrast, each of chiplets 620a-620h provides a same functionality. For example, in some designs, each of chiplets 620a-620h is an instantiation of a same processor core. In other designs, each of chiplets 620a-620h includes a same number and type of dies. In various implementations, each of the chiplets 620a-620h has the functionality of chiplets 110-140 (of FIGS. 1-3 and 8-9) and chiplets 410A-410B (of FIG. 4). The power manager 668 has the same functionality as the power manager 440 (of FIG. 4) and power manager 500 (of FIG. 5).

In some implementations, the integrated circuit 610 includes a central processing unit (CPU) with circuitry used for processing instructions of a selected instruction set architecture (ISA), a graphics processing unit (GPU) with circuitry that implements a high parallel data microarchitecture, a Hub used for communicating with multimedia engine, and a multimedia engine, such as engine 670, with circuitry that processes audio data and visual data for multimedia applications. In another implementation, the unit 650 and the functional blocks 660-666 include one or more application specific integrated circuits (ASICs) or microcontrollers, one or more digital signal processors (DSPs), analog-to-digital converters (ADCs), and digital-to-analog converters (DACs).

In an implementation, a communication fabric supports communication between the components of the integrated circuit 610. The communication fabric supports the transfer of messages, requests, responses, acknowledgments, commands, interrupts, and so forth between the multiple components within the integrated circuit 610 and one or more external processing units and peripheral devices. In various implementations, the communication among components of the integrated circuit 610 includes at least the links 624 between the unit 650 and the chiplets 620a-620h, each using a corresponding one of the receiver front-end blocks 622a-622h.

As shown, the links 624 have varying metal trace lengths based on an on-die location of a corresponding one of the chiplets 620a-620h. Therefore, the impedance of the links 624 vary among one another. In addition to the varying metal trace lengths, in some implementations, the metal traces of the transmission lines 624 also vary among metal layer thicknesses and spacings between metal traces. Therefore, in some implementations, the links 624 are divided into subsets that use different equalization coefficients for transmitters and receivers using the subsets of the links 624.

The circuitry of the interface 640 communicates with one of an external memory, an external peripheral device, another semiconductor chip, or other. The interface 640 includes queues for storing requests and responses as well as circuitry for supporting a particular communication protocol. Although a single interface is shown, it is possible and contemplated that the integrated circuit 610 uses multiple interfaces. In various implementations, the multiple components of the integrated circuit 610 supports a cache memory subsystem that includes integrated caches within the chiplets 620a-620h.

Figure 7:
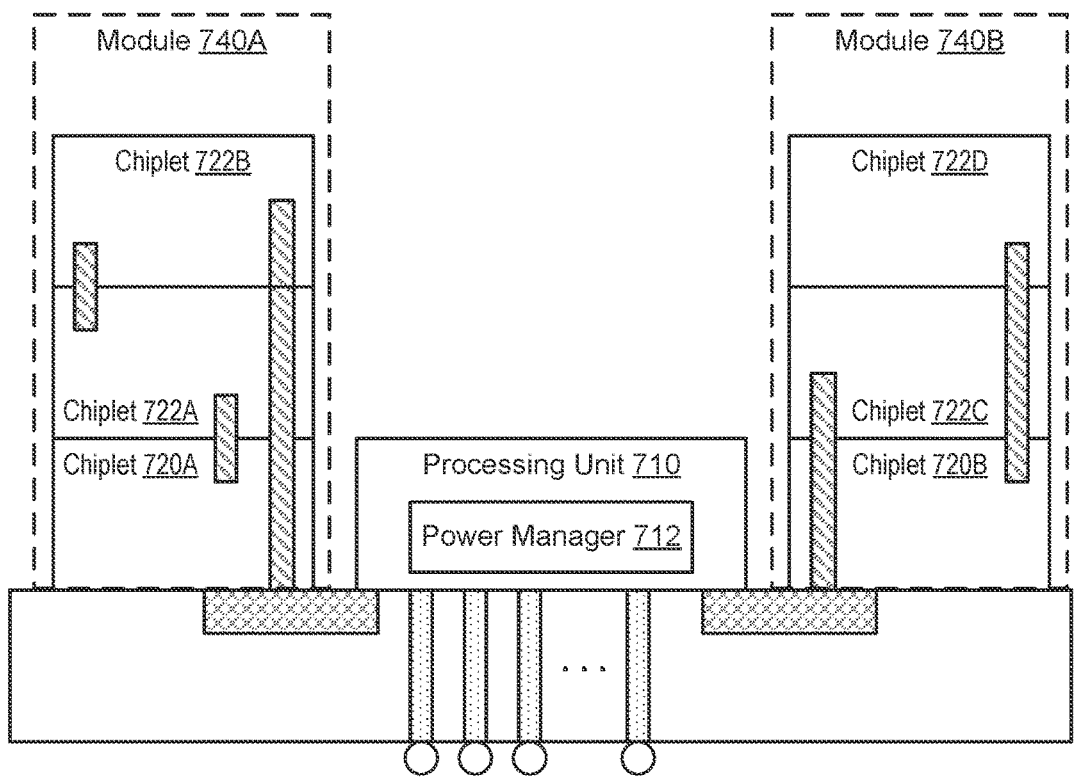
FIG. 7 is a generalized block diagram of a system-in-package that manages power consumption among replicated functional blocks of an integrated circuit.
Figure 7:
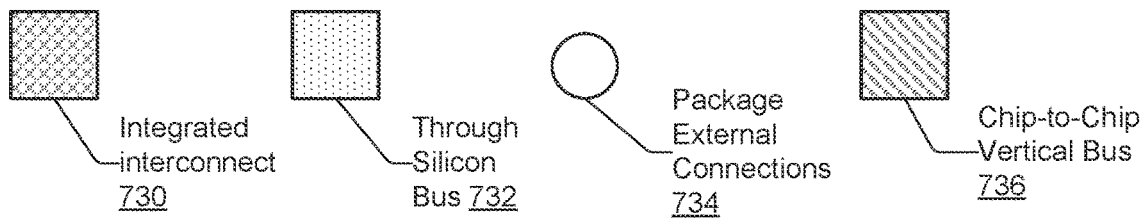

Turning now to FIG. 7, a generalized block diagram is shown of a system-in-package (SiP) 700 that manages power consumption among replicated chiplets of an integrated circuit. In various implementations, three-dimensional (3D) packaging is used within a computing system. This type of packaging is referred to as a System in Package (SiP). A SiP includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to the processing unit 710. Alternatively, a 3D IC is stacked directly on top of another IC.

Die-stacking technology is a fabrication process that enables the physical stacking of multiple separate pieces of silicon (integrated chips) together in a same package with high-bandwidth and low-latency interconnects. In some implementations, the die is stacked side by side on a silicon interposer, or vertically directly on top of each other. One configuration for the SiP is to stack one or more semiconductor dies (or dies) next to and/or on top of a processing unit such as processing unit 710. In an implementation, the SiP 700 includes the processing unit 710 and the modules 740A-740B. Module 740A includes the chiplet 720A and the chiplets 722A-722B. In various implementations, the chiplets 720A and 722A-722B are multiple three-dimensional (3D) semiconductor dies. Although a particular number of chiplets are shown, any number of chiplets is used as stacked 3D dies in other implementations.

The chiplet 720A is fabricated on a corresponding silicon wafer that is later dices to provide the chiplet 720A. Each of the chiplets 722A-722B is fabricated on a silicon wafer different from the silicon wafer used to provide the chiplet 720A and separate from the silicon wafer used to provide the processing unit 710. In some implementations, the chiplets 722A-722B include circuitry that renders video frame data that is later sent to a display controller (not shown). Each of the chiplets 722A-722B has a separate power rail, which allows one or more of the chiplets 722A-722B to be placed in a sleep state by the power manager 712 during an idle state that indicates a static screen of a display device. In some implementations, the module 740B is a replication of the module 740A. In various implementations, the power manager 712 has the functionality of the power manager 440 (of FIG. 4) and the power manager 500 (of FIG. 5). The power manager 712 is able to perform the steps for power management described regarding the apparatuses 100-300 (of FIGS. 1-3), the method 1000 (of FIG. 10), the apparatuses 800-900 (of FIGS. 8-9), and the method 1100 (of FIG. 11).

Each of the modules 740A-740B communicates with the processing unit 710 through horizontal low-latency interconnect 730. In various implementations, the processing unit 710 is a general-purpose central processing unit; a graphics processing unit (GPU), an accelerated processing unit (APU), a field programmable gate array (FPGA), or other data processing device. The in-package horizontal low-latency interconnect 730 provides reduced lengths of interconnect signals versus long off-chip interconnects when a SiP is not used. The in-package horizontal low-latency interconnect 730 uses particular signals and protocols as if the chips, such as the processing unit 710 and the modules 740A-740B, were mounted in separate packages on a circuit board. In some implementations, the SiP 700 additionally includes backside vias or through-bulk silicon vias 732 that reach to package external connections 734. The package external connections 734 are used for input/output (I/O) signals and power signals.

In various implementations, multiple device layers are stacked on top of one another with direct vertical interconnects 736 tunneling through them. In various implementations, the vertical interconnects 736 are multiple through silicon vias grouped together to form through silicon buses (TSBs). The TSBs are used as a vertical electrical connection traversing through a silicon wafer. The TSB s are an alternative interconnect to wire-bond and flip chips. The size and density of the vertical interconnects 736 that can tunnel between the different device layers varies based on the underlying technology used to fabricate the 3D ICs. As shown, some of the vertical interconnects 736 do not traverse through each of the modules 740A-740B. Therefore, in some implementations, the processing unit 710 does not have a direct connection to one or more dies such as die 722D in the illustrated implementation. Therefore, the routing of information relies on the other dies of the SiP 700.

Figure 8:
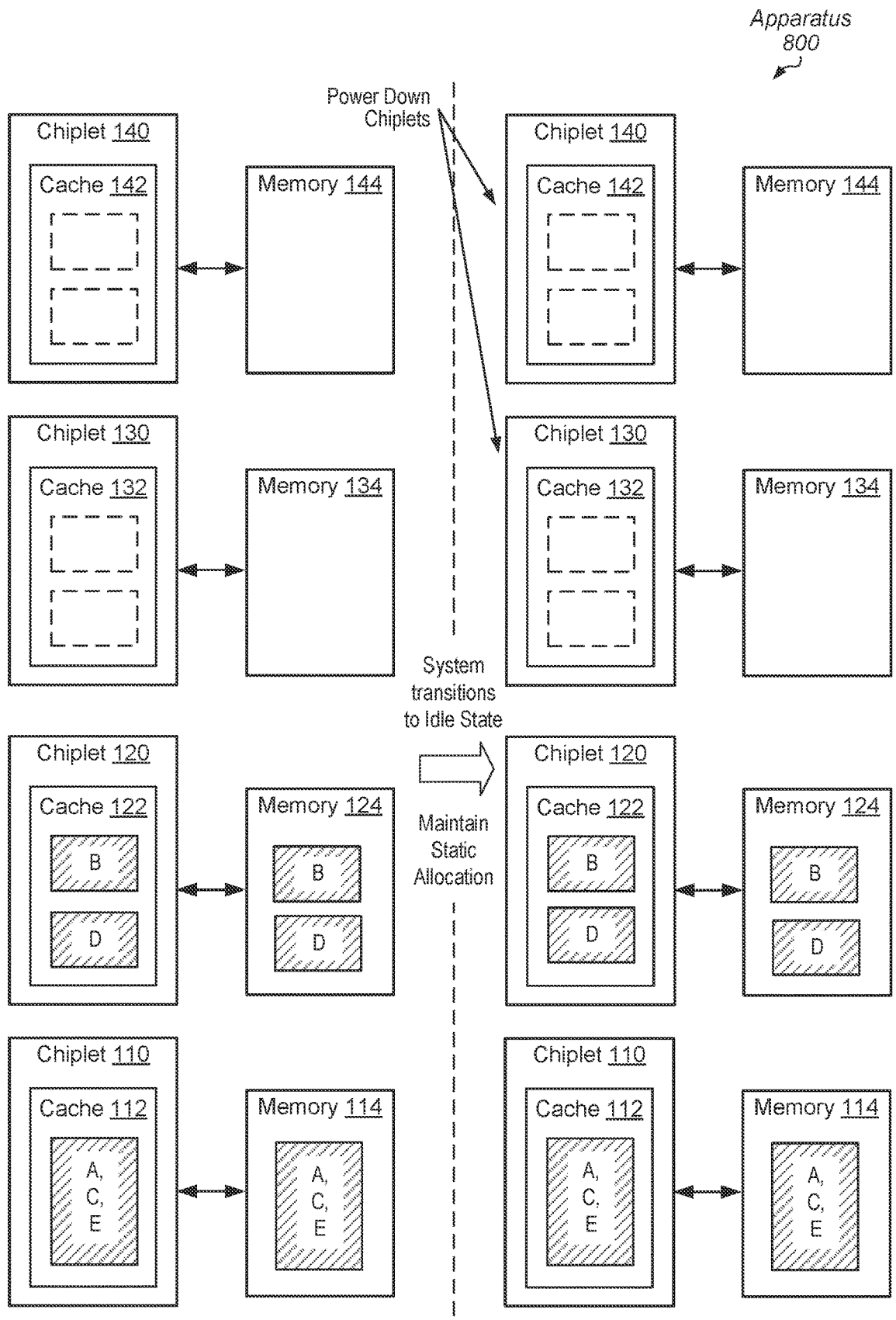
FIG. 8 is a generalized block diagram of an apparatus that manages power consumption among replicated functional blocks of an integrated circuit.

Referring to FIG. 8, a generalized block diagram is shown of an apparatus 800 that manages power consumption among replicated chiplets of an integrated circuit. Circuits and signals described earlier are numbered identically. Here, an assigned subset of the chiplets 110, 120, 130 and 140 and corresponding memories 114, 124, 134 and 144 store copies of the portions "A" to "E." In this implementation, the assigned subset includes the chiplets 110 and 120, or half of the total number of chiplets in apparatus 800. Rather than interleave data storage of the portions "A" to "E" among each of the chiplets 110, 120, 130 and 140 and corresponding memories 114, 124, 134 and 144, a fraction of the total number of chiplets 110, 120, 130 and 140 is statically assigned for allocation. In some implementations, the apparatus 800 is programmable to switch between storing data of the given type, such as portions "A" to "E," in each of the chiplets 110, 120, 130 and 140 and storing data of the given type in an assigned subset of the chiplets 110, 120, 130 and 140. When using the subset of the chiplets 110, 120, 130 and 140, as shown, in an implementation, the chiplet 110 stores the portions "A," "C" and "E," and the chiplet 120 stores the portions "B" and "D." Here, the threshold of cache utilization for storing data of the given type is a value indicating an amount of data one byte less than three portions, rather than two portions as described earlier. The threshold can be stored in a programmable configuration and status register (CSR).

The tradeoff between using dynamic relocation and static allocation is a faster transition to the idle state is achieved with static allocation although performance reduces with static allocation when the apparatus 800 is not in the idle state. With static allocation (assignment of the subset), the power management circuitry (or other circuitry) does not need to dynamically identify which ones of the chiplets 110, 120, 130 and 140 do not store data of the given type. The static allocation was setup prior to processing the workload. Therefore, transition to the idle state for the chiplets 110, 120, 130 and 140 is faster using static allocation, rather than using dynamic identification at the time of initiating the transition to the idle state.

When the apparatus 800 is not in the idle state, but rather, the apparatus 800 is rendering new video frame data, the performance is reduced due to using only the chiplets 110 and 120. However, the power management circuitry (or other circuitry) predicts that the performance will be above a performance threshold when limiting storage of the data of the given type to the subset of chiplets such as only the chiplets 110 and 120. When the power management circuitry either determines an idle state, or receives an indication of the idle state that indicates a static screen of the display device, no data of the given type is moved between the chiplets 110, 120, 130 and 140. Rather, the power management circuitry can immediately transition each of the chiplets 130 and 140 to a sleep state.

The power management circuitry assigns operating parameters of an active state to the chiplets 110 and 120, and assigns the sleep state to chiplets 130 and 140. To perform the refresh operations during the idle state, the display device requests data of the given type (portions "A" to "E") from the chiplets 110 and 120 of the apparatus 800. While still supporting the refresh operations, the apparatus 800 reduces power consumption by transitioning the chiplets 130 and 140 to the sleep state, rather than maintaining the chiplets 130 and 140 in an active state.

Figure 9:
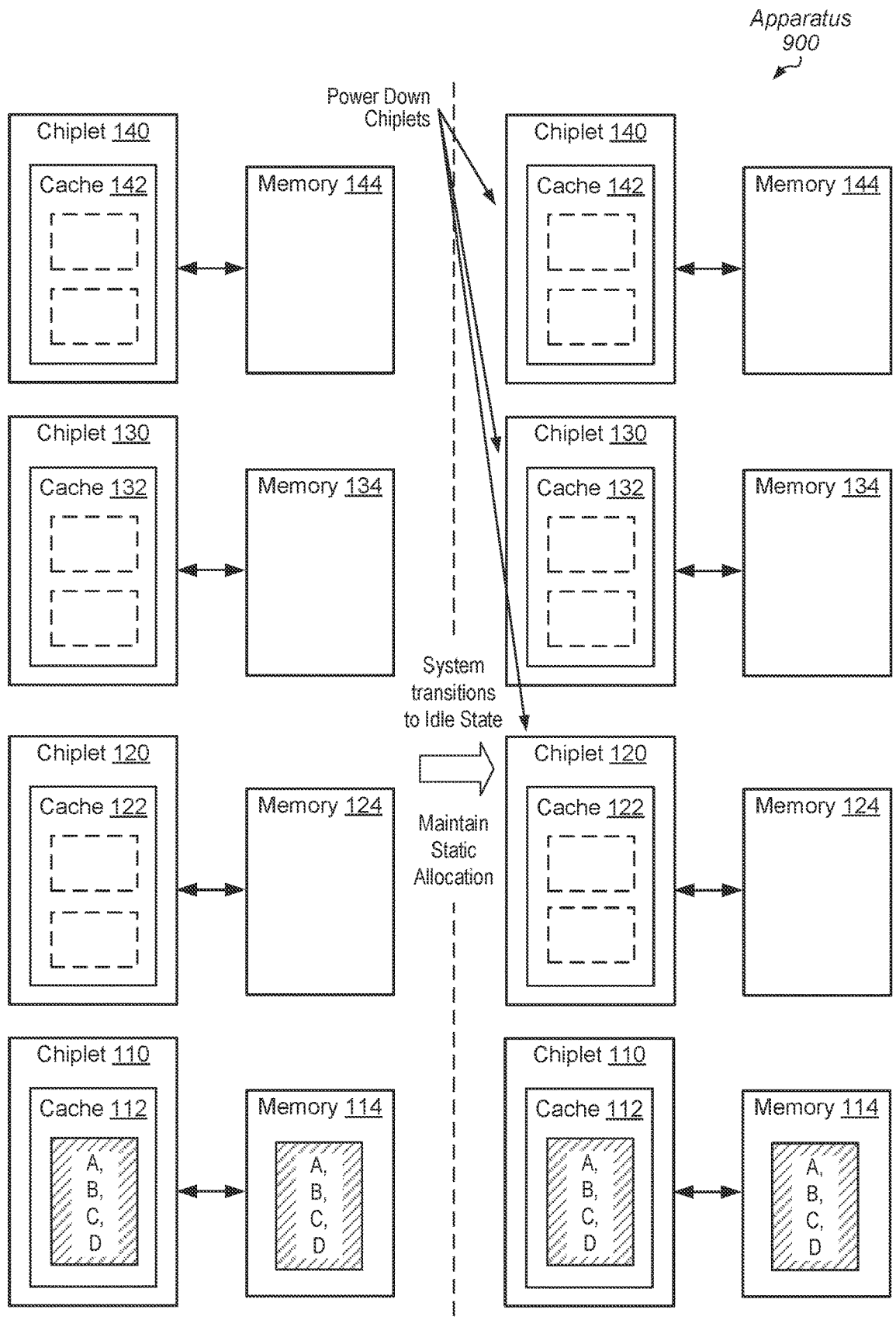
FIG. 9 is a generalized block diagram of an apparatus that manages power consumption among replicated functional blocks of an integrated circuit.

Referring to FIG. 9, a generalized block diagram is shown of an apparatus 900 that manages power consumption among replicated chiplets of an integrated circuit. Circuits and signals described earlier are numbered identically. Here, an assigned subset of the chiplets 110, 120, 130 and 140 and corresponding memories 114, 124, 134 and 144 store copies of the portions "A" to "D." In this implementation, the assigned subset includes the chiplet 110, or one fourth of the total number of chiplets in apparatus 900. When the apparatus 900 is not in the idle state, but rather, the apparatus 900 is rendering new video frame data, the performance is reduced due to using only the chiplet 110. However, the power management circuitry (or other circuitry) predicts that the performance will be above a performance threshold when limiting storage of the data of the given type to the subset of chiplets such as only the chiplet 110.

When the power management circuitry either determines an idle state, or receives an indication of the idle state that indicates a static screen of the display device, no data of the given type is moved between the chiplets 110, 120, 130 and 140. Rather, the power management circuitry can immediately transition each of the chiplets 120, 130 and 140 to a sleep state. The power management circuitry assigns operating parameters of an active state to the chiplet 110, and assigns the sleep state to chiplets 120, 130 and 140. To perform the refresh operations during the idle state, the display device requests data of the given type (portions "A" to "D") from the chiplet 110 of the apparatus 900. While still supporting the refresh operations, the apparatus 900 reduces power consumption by transitioning the chiplets 120, 130 and 140 to the sleep state, rather than maintaining the chiplets 120, 130 and 140 in an active state.

For methods 1000 and 1100 (of FIGS. 10-11), an integrated circuit includes multiple replicated chiplets. Each chiplet includes circuitry operable to use a separate power domain. Therefore, circuitry of a first chiplet shares at least a same first power rail and a same first clock reference signal. Similarly, the circuitry of a second chiplet shares at least a same second power rail and a same second clock reference signal. The second power rail is different from the first power rail, and the second clock reference signal is different from the first clock reference signal. Therefore, at least the second chiplet uses a different power domain than the first chiplet, and thus, the second chiplet is capable of using different operating parameters than the first chiplet. For example, one of the first chiplet and the second chiplet is able to be powered down or placed in a sleep state while the other chiplet remains in one of multiple active states.

In the case of using an MCM, one or more of the chiplets are connected to separate power rails, and therefore, can use separate power domains. Similarly, in the case of using an SoC, one or more of the functional blocks are connected to separate power rails, and therefore, can use separate power domains. Therefore, the techniques and steps described earlier and described in the upcoming description directed to power management of multiple, replicated chiplets placed in a MCM are also applicable for power management of multiple, replicated functional blocks placed in an SoC.

Figure 10:
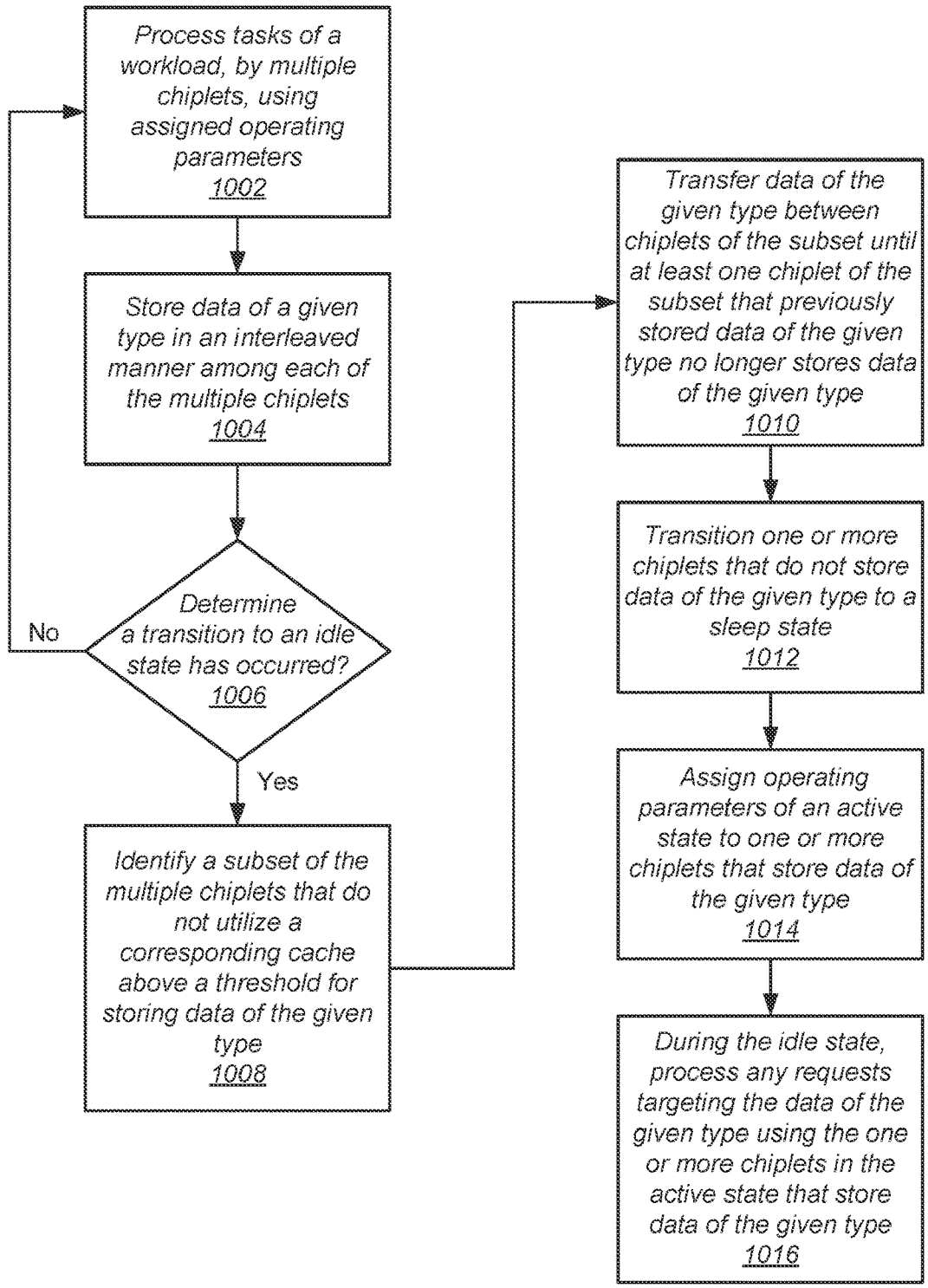
FIG. 10 is a generalized diagram of a method for efficiently managing power consumption among replicated functional blocks of an integrated circuit.

Referring to FIG. 10, a generalized block diagram is shown of a method 1000 for efficiently managing power consumption among replicated chiplets of an integrated circuit. For purposes of discussion, the steps in this implementation (as well as in FIG. 11) are shown in sequential order. However, in other implementations some steps occur in a different order than shown, some steps are performed concurrently, some steps are combined with other steps, and some steps are absent.

Hardware, such as circuitry, of multiple chiplets of an integrated circuit process tasks of a workload using assigned operating parameters (block 1002). In various implementations, a power manager assigns a respective power domain to each of the chiplets. Each of the power domains includes at least operating parameters such as at least an operating power supply voltage and an operating clock frequency. Each of the power domains also includes control signals for enabling and disabling connections to clock generating circuitry and a power supply reference. In an implementation, the multiple chiplets process tasks of a video graphics workload such as rendering video frame data for a display device. The data of a given type is video frame data of a frame buffer that has been rendered by the multiple chiplets. This data of the given type is sent from the multiple chiplets to a display device.

The multiple chiplets store data of the given type in an interleaved manner among each of the multiple chiplets (block 1004). For example, a first portion of the data of the given type is stored in a first chiplet, and a second portion different from the first portion of the data of the given type is stored in a second chiplet. A third portion different from the first portion and the second portion of the data of the given type is stored in a third chiplet, and so on. When the last chiplet of the multiple chiplets has a portion of the data of the given type stored in it, a next portion of the data of the given type is stored in the first chiplet. Data storage of the data of the given type continues in this manner. In some implementations, each portion is a contiguous portion compared to a previous portion, and each portion has a same size. In other implementations, one or more portions have a different size, and one or more portions is not a contiguous portion compared to a previous portion.

In various implementations, the multiple chiplets store data in a local memory device such as one of a variety of types of DRAM. In addition, the multiple chiplets store a copy of the data of the given type in a corresponding cache. In an implementation, the cache is a last-level cache of a cache memory subsystem hierarchy. The cache can support a writeback policy, or the cache can support a writethrough policy. In some implementations, the power manager determines when tasks of a workload enter an idle state. In other implementations, the power manager receives an indication of the idle state. The idle state can indicate a static screen of the display device. For example, a video graphics application no longer updates frame data to be viewed on the display device. It is possible that the video graphics application is paused or is waiting for further user input, and during the wait time, the scene or picture is not updated on the display device. Therefore, the video processing subsystem of the computing system that includes the multiple chiplets enters an idle state although the video graphics application has not stopped being executed.

If the circuitry of a power manager determines a transition to an idle state has not yet occurred ("no" branch of the conditional branch 1006), then control flow of method 1000 returns to block 1002 where the multiple chiplets of the integrated circuit process tasks of the workload using assigned operating parameters. However, if the power manager determines a transition to an idle state has occurred ("yes" branch of the conditional branch 1006), then the power manager identifies a subset of the multiple chiplets that do not utilize a corresponding cache above a threshold for storing data of the given type (block 1008). The threshold can be a value stored in a programmable configuration and status register (CSR). The power manager sends commands to the multiple chiplets to transfer data of the given type between chiplets of the subset until at least one chiplet of the subset that previously stored data of the given type no longer stores data of the given type (block 1010). Following, the power manager transitions one or more chiplets that do not store data of the given type to a sleep state (block 1012).

The power manager assigns operating parameters of an active state to one or more chiplets that store data of the given type (block 1014). The active state can be associated with a low power-performance state (P-state), but the active state allows dies of these assigned chiplets to still process a task when requested. During the idle state, the one or more chiplets that store data of the given type process any generated requests targeting the data of the given type (block 1016). For example, despite not requesting new frame data to be rendered, the display device of the computing system still performs refresh operations. To do so, the display device requests data of the given type from the one or more chiplets in that active state, rather than the sleep state, that store the data of the given type. In this case, the data of the given type is the rendered data of the last frame to be processed before the transition to the idle state indicating a static screen of the display device.

Figure 11:
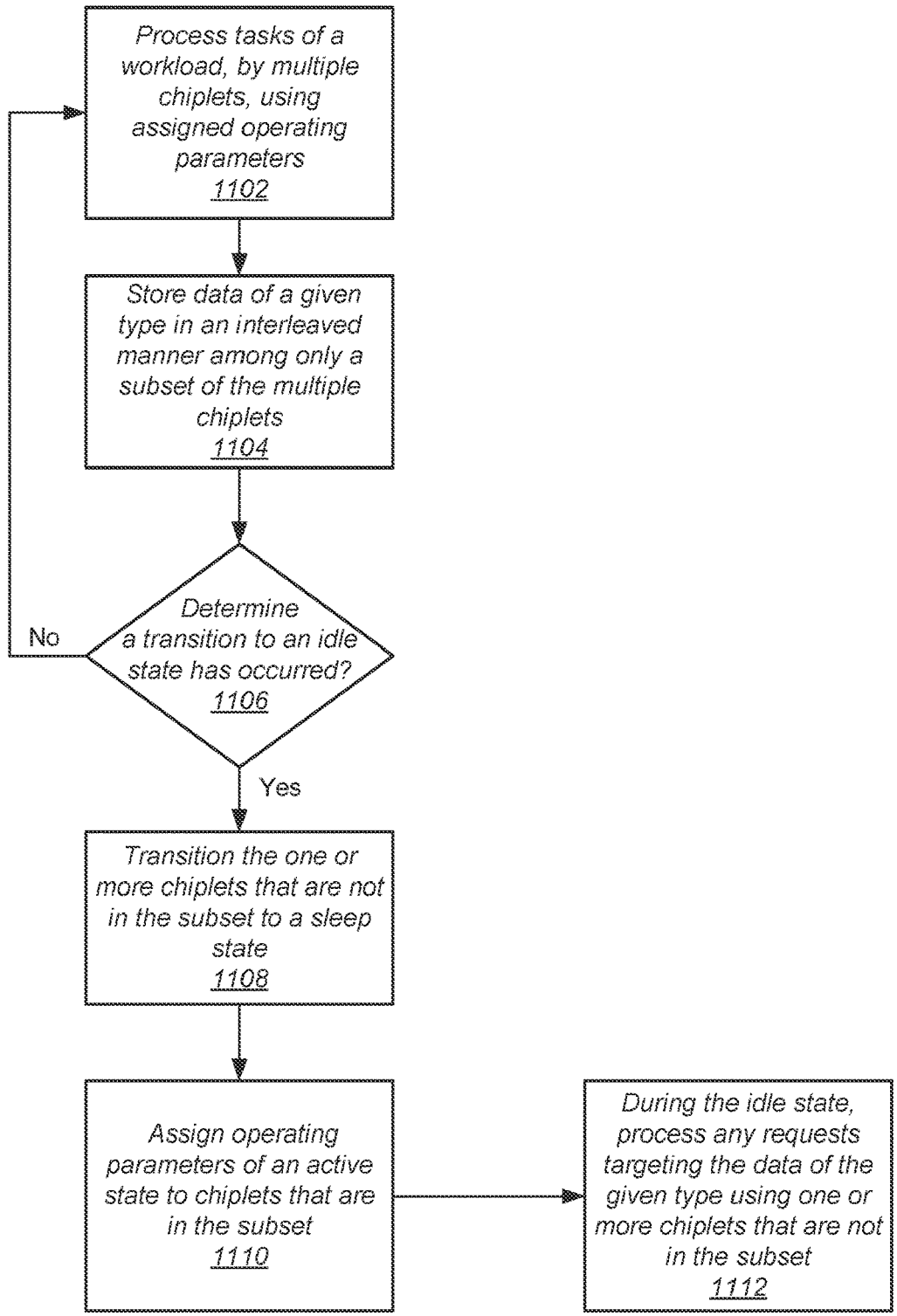
FIG. 11 is a generalized diagram of a method for efficiently managing power consumption among replicated functional blocks of an integrated circuit.

Turning now to FIG. 11, a generalized block diagram is shown of a method 1100 for efficiently managing power consumption among replicated chiplets of an integrated circuit. Hardware, such as circuitry, of multiple chiplets of an integrated circuit process tasks of a workload using assigned operating parameters (block 1102). In various implementations, a power manager assigns a respective power domain to each of the chiplets. In an implementation, the multiple chiplets process tasks of a video graphics workload such as rendering video frame data for a display device. The data of the given type is video frame data of a frame buffer that has been rendered by the multiple chiplets. This data of the given type is sent from the multiple chiplets to a display device.

The multiple chiplets store data of a given type in an interleaved manner among only a subset of the multiple chiplets (block 1104). For example, if only a half of the chiplets are permitted to store the data of the given type, then a first portion of the data of the given type is stored in a first chiplet, of the subset, and a second portion different from the first portion of the data of the given type is stored in a second chiplet of the subset. A third portion different from the first portion and the second portion of the data of the given type is stored in a third chiplet of the subset, and so on. When the last chiplet of the subset, such as a half of the multiple chiplets, has a portion of the data of the given type stored in it, a next portion of the data of the given type is stored in the first chiplet of the subset.

In an implementation with eight chiplets, the data of the given type is stored in only four of the eight chiplets. Therefore, data storage of the data of the given type is interleaved among the four chiplets (such as chiplets with identifiers 0-3), while the chiplets with identifiers 4-7 are not used for the data storage. In an implementation, if the video frame data cannot fit in the assigned subset of chiplets, then after the memory devices of the subset of chiplets become full from data storage, the video frame buffer data is sent to chiplets not belonging to the subset for data storage. In other implementations, the subset of chiplets is one fourth of the number of chiplets, or another number of chiplets. The number of chiplets in the subset is based on design requirements.

In some implementations, the power manager determines when tasks of a workload enter an idle state. In other implementations, the power manager receives an indication of the idle state. For example, a video graphics application no longer updates video frame data to be viewed on the display device. If the circuitry of the power manager determines a transition to an idle state has not yet occurred ("no" branch of the conditional branch 1106), then control flow of method 1100 returns to block 1102 where the multiple chiplets of the integrated circuit process tasks of the workload using assigned operating parameters. However, only the subset of chiplets store data of the given type.

If the power manager determines a transition to an idle state has occurred ("yes" branch of the conditional branch 1106), then the power manager transitions the chiplets that are not in the subset to a sleep state (block 1112). The power manager does not need to dynamically identify which chiplets do not store data of the given type, since a static allocation was setup prior to processing the workload. Therefore, transition to the idle state for the chiplets is faster using static allocation, rather than using dynamic identification at the time of initiating the transition to the idle state. The tradeoff is maximum performance can be achieved by storing data of the given type in each of the multiple chiplets. The performance is predicted to be above a performance threshold when limiting storage of the data of the given type to the subset of chiplets.

The power manager assigns operating parameters of an active state to the chiplets in the subset that store data of the given type (block 1110). The active state can be associated with a low power-performance state (P-state), but the active state allows dies of these assigned chiplets to still process a task when requested. During the idle state, the one or more chiplets in the subset that store data of the given type process any generated requests targeting the data of the given type (block 1112). For example, despite not requesting new frame data to be rendered, the display device of the computing system still performs refresh operations.

Figure 12:
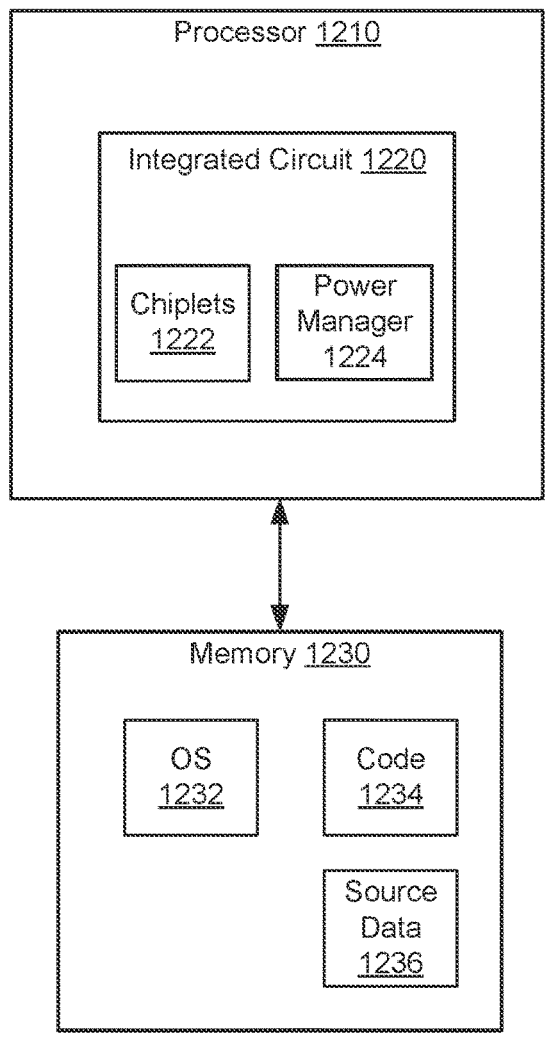
FIG. 12 is a generalized block diagram of a computing system that manages power consumption among replicated functional blocks of an integrated circuit.

Referring to FIG. 12, a generalized block diagram is shown of a computing system 1200 that manages power consumption among replicated chiplets of an integrated circuit. The computing system 1200 includes the processor 1210 and the memory 1230. Interfaces, such as a memory controller, a bus, or a communication fabric, one or more phased locked loops (PLLs) and other clock generation circuitry, a power management unit, and so forth, are not shown for ease of illustration. It is understood that in other implementations, the computing system 1200 includes one or more of other processors of a same type or a different type than processor 1210, one or more peripheral devices, a network interface, one or more other memory devices, and so forth. In some implementations, the functionality of the computing system 1200 is incorporated on a multi-chip module (MCM) The computing system 1200 is used in any of a variety of computing devices such as a desktop computer, a tablet computer, a laptop, a smartphone, a smartwatch, a gaming console, a personal assistant device, and so forth.

The processor 1210 includes hardware such as circuitry. For example, the processor 1210 includes at least one integrated circuit 1220. The integrated circuit 1220 includes chiplets 1222 where one or more of these chiplets 1222 have the functionality of chiplets 110-140 (of FIGS. 1-3 and 8-9) and chiplets 410A-410B (of FIG. 4). The power manager 1224 has the same functionality as the power manager 440 (of FIG. 4) and power manager 500 (of FIG. 5). The power manager 1224 is able to perform the steps described regarding the description of power management by the apparatuses 100-300 (of FIGS. 1-3) and apparatuses 800-900 (of FIGS. 8-9). In some implementations, the processor 1210 includes one or more processing units. In some implementations, each of the processing units includes one or more processor cores capable of general-purpose data processing, and an associated cache memory subsystem. In such an implementation, the processor 1210 is a central processing unit (CPU). In another implementation, the processing cores are compute units, each with a highly parallel data microarchitecture with multiple parallel execution lanes and an associated data storage buffer. In such an implementation, the processor 1210 is a graphics processing unit (GPU), a digital signal processor (DSP), or other.

In some implementations, the memory 1230 includes one or more of a hard disk drive, a solid-state disk, other types of flash memory, a portable solid-state drive, a tape drive and so on. The memory 1230 stores an operating system (OS) 1232, one or more applications represented by code 1234, and at least source data 1236. Memory 1230 is also capable of storing intermediate result data and final result data generated by the processor 1210 when executing a particular application of code 1234. Although a single operating system 1232 and a single instance of code 1234 and source data 1236 are shown, in other implementations, another number of these software components are stored in memory 1230. The operating system 1232 includes instructions for initiating the boot up of the processor 1210, assigning tasks to hardware circuitry, managing resources of the computing system 1200 and hosting one or more virtual environments.

Each of the processor 1210 and the memory 1230 includes an interface unit for communicating with one another as well as any other hardware components included in the computing system 1200. The interface units include queues for servicing memory requests and memory responses, and control circuitry for communicating with one another based on particular communication protocols. The communication protocols determine a variety of parameters such as supply voltage levels, power-performance states that determine an operating supply voltage and an operating clock frequency, a data rate, one or more burst modes, and so on.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
a plurality of functional blocks, each comprising circuitry configured to execute tasks and a cache configured to store data; and
power management circuitry configured to:
assign operating parameters to the plurality of functional blocks; and
in response to an idle state of the plurality of functional blocks:
assign first operating parameters to one or more functional blocks of the plurality of functional blocks that do not store data of a given type; and
assign second operating parameters to one or more functional blocks of the plurality of functional blocks that store data of the given type, wherein the first operating parameters provide lower power consumption than the second operating parameters.

2. The integrated circuit as recited in claim 1, wherein the data of the given type is video frame data.

3. The integrated circuit as recited in claim 1, wherein the power management circuitry is further configured to:
identify a first subset of the plurality of functional blocks that do not utilize a corresponding cache above a threshold for storing data of a given type; and
transfer data of the given type between functional blocks of the first subset until at least one functional block of the first subset that previously stored data of the given type no longer stores data of the given type.

4. The integrated circuit as recited in claim 1, wherein the plurality of functional blocks are configured to store data of the given type in an interleaved manner among only a second subset of the plurality of functional blocks.

5. The integrated circuit as recited in claim 3, wherein the power management circuitry is further configured to transfer data of the given type between functional blocks of the first subset until at least one functional block of the first subset utilizes the cache above the threshold for storing data of the given type.

6. The integrated circuit as recited in claim 3, wherein one or more of the plurality of functional blocks are configured to:
perform a writeback operation to store a copy of data in a memory when storing the data in the cache; and
skip performing the writeback operation when writing data to the cache based on transferring data of the given type between functional blocks of the first subset.

7. The integrated circuit as recited in claim 3, wherein the plurality of functional blocks are configured to store data of the given type in an interleaved manner among each of the plurality of functional blocks.

8. A method comprising:
assigning, by power management circuitry, operating parameters to a plurality of functional blocks, each comprising circuitry configured to execute tasks and a cache configured to store data; and
in response to an idle state of the plurality of functional blocks:
assigning, by the power management circuitry, first operating parameters to one or more functional blocks of the plurality of functional blocks that do not store data of a given type; and
assigning, by the power management circuitry, second operating parameters to one or more functional blocks of the plurality of functional blocks that store data of the given type, wherein the first operating parameters provide lower power consumption than the second operating parameters.

9. The method as recited in claim 8, wherein data of the given type is video frame data.

10. The method as recited in claim 8, further comprising:
identifying, by the power management circuitry, a first subset of the plurality of functional blocks that do not utilize a corresponding cache above a threshold for storing data of a given type; and
transferring data of the given type, by the power management circuitry, between functional blocks of the first subset until at least one functional block of the first subset that previously stored data of the given type no longer stores data of the given type.

11. The method as recited in claim 8, further comprising storing data of the given type, by the plurality of functional blocks, in an interleaved manner among only a second subset of the plurality of functional blocks.

12. The method as recited in claim 10, further comprising transferring data of the given type, by the power management circuitry, between functional blocks of the first subset until at least one functional block of the first subset utilizes the cache above the threshold for storing data of the given type.

13. The method as recited in claim 10, further comprising:
performing a writeback operation, by one or more of the plurality of functional blocks, to store a copy of data in a memory when storing the data in the cache; and
skipping performing the writeback operation, by one or more of the plurality of functional blocks, when writing data to the cache based on transferring data of the given type between functional blocks of the first subset.

14. The method as recited in claim 10, further comprising storing data of the given type, by the plurality of functional blocks, in an interleaved manner among each of the plurality of functional blocks.

15. A computing system comprising:
a memory configured to store instructions of one or more tasks and source data to be processed by the one or more tasks;
an integrated circuit configured to execute the instructions using the source data, wherein the integrated circuit comprises:
a plurality of functional blocks, each comprising circuitry configured to execute tasks and a cache configured to store data; and
power management circuitry configured to:
assign operating parameters to the plurality of functional blocks; and
in response to an idle state of the plurality of functional blocks:
assign first operating parameters to one or more functional blocks of the plurality of functional blocks that do not store data of a given type; and
assign second operating parameters to one or more functional blocks of the plurality of functional blocks that store data of the given type, wherein the first operating parameters provide lower power consumption than the second operating parameters.

16. The computing system as recited in claim 15, wherein the power management circuitry is further configured to transition the one or more functional blocks that do not store data of the given type to a sleep state.

17. The computing system as recited in claim 15, wherein the power management circuitry is further configured to:
- identify a first subset of the plurality of functional blocks that do not utilize a corresponding cache above a threshold for storing data of a given type; and
- transfer data of the given type between functional blocks of the first subset until at least one functional block of the first subset that previously stored data of the given type no longer stores data of the given type.

18. The computing system as recited in claim 17, wherein the power management circuitry is further configured to transfer data of the given type between functional blocks of the first subset until at least one functional block of the first subset utilizes the cache above the threshold for storing data of the given type.

19. The computing system as recited in claim 17, wherein one or more of the plurality of functional blocks are configured to:
- perform a writeback operation to store a copy of data in a memory when storing the data in the cache; and
- skip performing the writeback operation when writing data to the cache based on transferring data of the given type between functional blocks of the first subset.

20. The computing system as recited in claim 17, wherein the plurality of functional blocks are configured to store data of the given type in an interleaved manner among each of the plurality of functional blocks.

\* \* \* \* \*